United States Patent
Chen

(10) Patent No.: US 7,167,089 B2
(45) Date of Patent: Jan. 23, 2007

(54) BURGLAR ALARM USING POWER CORD TO TRANSMIT SIGNALS AND METHOD FOR CONTROLLING THE SAME

(75) Inventor: Tse-Hsing Chen, Taipei (TW)

(73) Assignee: Shu-Chen Lu, Taipei Shien (TW)

( * ) Notice: Subject to any disclaimer, the term of this patent is extended or adjusted under 35 U.S.C. 154(b) by 139 days.

(21) Appl. No.: 10/975,366

(22) Filed: Oct. 29, 2004

(65) Prior Publication Data
US 2006/0097867 A1 May 11, 2006

(51) Int. Cl.
*G08B 1/08* (2006.01)
*H04M 11/04* (2006.01)

(52) U.S. Cl. ............ 340/538; 340/538.11; 340/538.14; 340/538.16; 340/426.1

(58) Field of Classification Search ..............................
340/426.12–426.19, 566, 425.5, 538, 310.11, 340/310.18, 439, 538.11, 538.14, 538.16
See application file for complete search history.

(56) References Cited

U.S. PATENT DOCUMENTS

| | | | | |
|---|---|---|---|---|
| 4,335,381 A | * | 6/1982 | Palmer | .................. 340/825.21 |
| 4,741,340 A | * | 5/1988 | Batina et al. | .................. 607/27 |
| 5,777,544 A | * | 7/1998 | Vander Mey et al. | ....... 370/465 |
| 6,243,413 B1 | * | 6/2001 | Beukema | ..................... 375/222 |
| 6,407,987 B1 | * | 6/2002 | Abraham | ..................... 370/295 |
| 6,608,555 B1 | * | 8/2003 | Chang | ......................... 340/439 |
| 6,800,867 B1 | * | 10/2004 | Maier | ......................... 250/551 |

* cited by examiner

*Primary Examiner*—Jeffery Hofsass
*Assistant Examiner*—Hoi C. Lau
(74) *Attorney, Agent, or Firm*—Bacon & Thomas, PLLC

(57) ABSTRACT

A burglar alarm includes a main unit provided with a power supply voltage regulator circuit, a CPU circuit, an FET driving circuit, and an RLC oscillation circuit to convert digital code signals into analog signals, which are amplified and then carried via a power cord; and a decoding horn provided with a power supply voltage regulator circuit, a reference voltage circuit, an RLC oscillation circuit, a comparison circuit, a CPU circuit, and a horn voice driving circuit to decode and compare a received burglar-alarming signal and drive a horn to make vocal and sounding warnings. The burglar alarm is controlled via different frequencies that represent codes 1 and 0, or a base frequency and different pulse widths representing codes 1 and 0, so that the signals are carriable via the power cord without interference from noise on the power word.

1 Claim, 4 Drawing Sheets

BURGLAR ALARM USING POWER CORD TO TRANSMIT SIGNALS AND METHOD FOR CONTROLLING THE SAME

FIELD OF THE INVENTION

The present invention relates to a burglar alarm for a car, and more particularly to a burglar alarm using a power cord to transmit signals and a method for controlling the burglar alarm. In the method of the present invention, different frequencies are used as codes 1 and 0, or a base frequency and different pulse widths are used as codes 1 and 0 to allow carrying of such code signals over a power cord connected to the burglar alarm, so that drilling on the firewall of a car and mutual interference between a main unit and a horn of the burglar alarm could be avoided.

BACKGROUND OF THE INVENTION

Most of the currently available burglar alarms include a horn output line, which is connected to a siren horn for the latter to make a loud sound as a warning signal. To install the burglar alarm on a car, it is necessary to extend the horn output line from an interior of the car into an engine chamber via a firewall, and finally connect the horn output line to the siren horn. To enable successful extending of the horn output line through the firewall, it is necessary to expand a wiring hole and/or an engine hood opening stay hole originally provided on the firewall. Sometimes, it is even necessary to drill a new hole on the firewall to complete the installation of the burglar alarm. The expanding and drilling of holes on the firewall not only requires additional time and labor, but also spoils or damages the original airtight and watertight ability of the firewall to disadvantageously admit exhaust and wastewater to the car.

A solution to the problems of additional installing time and labor as well as spoiling the original airtight and watertight ability of the firewall is to design the siren horn as a wireless component for wirelessly transmitting warning signals. It is possible to control the wireless siren horn via a main unit of the burglar alarm simply by electrically connecting the siren horn to positive and negative electrodes of the battery of the car.

Moreover, to avoid mutual interference between the wireless siren horn and the main unit of the burglar alarm, the siren horn and the main unit must be designed to work at considerably different radio frequencies.

However, in some countries, only a certain band or a certain frequency is allowed for the purpose of a wireless burglar alarm. In this case, the wireless siren and the main unit of the burglar alarm having the same frequency must be actuated at different time to avoid interference with each other. A serious problem with the latter case is the siren horn could not operate as soon as an instruction is received from the main unit and therefore has largely reduced function.

Another way to overcome the above-mentioned problems is to use a power cord to transmit codes for the siren horn to make warning sounds. However, the power cord also carries noises that cause deformation in the magnitude of high and low voltages and therefore prevent the high and low voltages from being used as code 1 (one) and code 0 (zero), respectively.

It is therefore desirable to develop a burglar alarm using a power cord to transmit signals and a method for controlling the burglar alarm.

SUMMARY OF THE INVENTION

A primary object of the present invention is to provide a burglar alarm using power cord to transmit signals.

In the burglar alarm of the present invention, either two different frequencies are separately used as codes 1 and 0, or a specific frequency is used as a base frequency while different pulse widths are separately used as codes 1 and 0. In this manner, additional wiring for the burglar alarm is eliminated to save time and labor for installing thereof, and drilling of holes on the firewall is also eliminated to maintain the airtight and watertight ability of the firewall. Moreover, the problems of mutual interference between the siren horn and the main unit of the burglar alarm using the same radio frequency, and asynchronous activity of the siren horn and the main unit due to the same or similar frequencies thereof could therefore be avoid.

To achieve the object, the burglar alarm provided by the present invention mainly includes a main unit, in which a power supply voltage regulator circuit, a central processing unit (CPU) circuit, a field effect transistor (PET) driving circuit, and an RLC (Resistance-Inductance-Capacitance) oscillation circuit are provided to convert digital signals into analog signals, which are then amplified to be carried via power cord; and a decoding horn, in which a power supply voltage regulator circuit, a reference voltage circuit, an RLC oscillation circuit, a comparison circuit, a CPU circuit, and a horn voice driving circuit are provided to decode and compare a received warning signal, and drive the horn to make vocal and sounding warnings.

Another object of the present invention is to provide a method for controlling the above-mentioned burglar alarm using a power cord to transmit signals.

To achieve this object, either different frequencies are separately used as codes 1 and 0, or a specific frequency is used as a base frequency while different band widths are separately used as codes 1 and 0, so that warning signals could be conveniently carried via a power cord without being interfered by noises to quickly and accurately actuate the burglar alarm.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
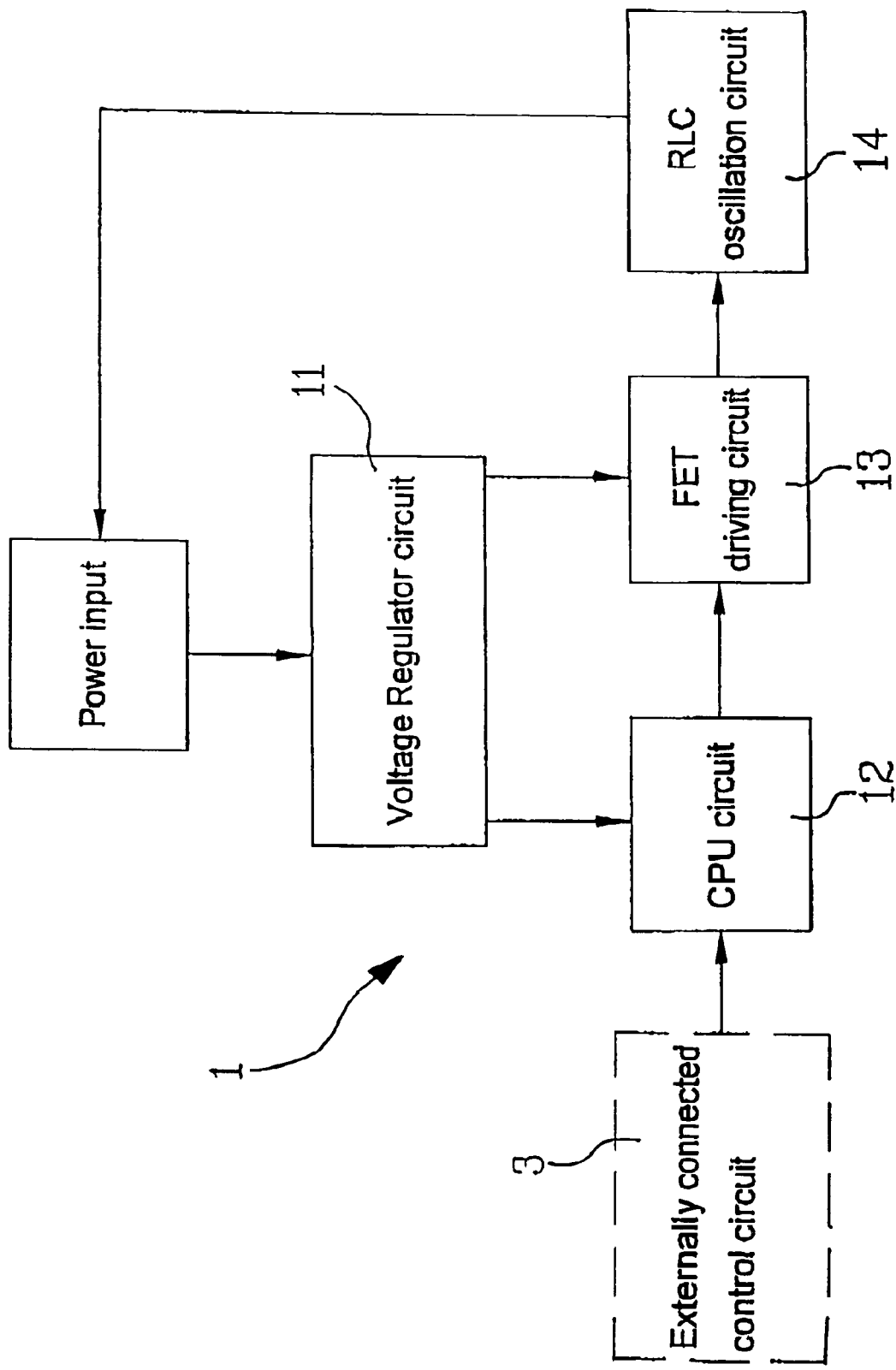
FIG. 1 is a block diagram of a main unit of the burglar alarm using a power cord to transmit signals according to the present invention.

Please refer to FIGS. 1 to 4 in which a burglar alarm using a power cord to transmit signals according to one embodiment is shown. As shown, the burglar alarm of the present embodiment mainly includes a main unit 1 and a wireless decoding horn 2.

The main unit 1 includes a power supply voltage regulator circuit 11 for supplying power needed by different sections of the main unit 1; a CPU circuit 12 for encoding and receiving instructions from an externally connected control circuit 3, and generating digital codes having a specific frequency from received signals; an FET driving circuit 13 for amplifying the digital codes; and an RLC oscillation circuit 14 for converting the digital signals into analog signals, which are amplified and coupled from a primary coil to a secondary coil of a transformer before being carried via a power cord.

The decoding horn 2 is internally provided with a power supply voltage regular circuit 21 for supplying power needed by different sections of the decoding horn 2; a reference voltage circuit 22 for providing a reference voltage used as a basis in comparison; an RLC oscillation circuit 23 for retrieving the analog code signals from the power cord, filtering off the voltage across the power cord, and amplifying remaining code signals; a comparison circuit 24 for converting the analog code signals into digital code signals; a CPU circuit 25 for decoding and comparing a received burglar-alarming signal with the reference voltage; and a horn voice driving circuit 26 for driving a horn 27 to make vocal and sounding warnings.

With the above arrangement, the burglar alarm using a power cord to transmit signals according to the present invention is controllable through using different frequencies as code 1 and 0, or using a specific frequency as a base frequency while using different pulse widths as codes 1 and 0, so that the burglar-alarming signals are carriable by a power cord without being interfered by noises on the power cord.

FIG. 1 shows the operational principle of a main unit 1 of a burglar alarm of an embodiment of the present invention. A power input passes the voltage regulator circuit 11 to supply voltage required by the entire circuitry of the main unit 1 to work. The CPU circuit 12 includes an electrically erasable programmable read-only memory (EEPROM) adapted to encode and receive instructions from an externally connected control circuit 3. Codes encoded by the CPU circuit 12 are sent to the FET driving circuit 13 and then the RLC oscillation circuit 14, so that digital signals in the form of codes 0 and 1 are converted into analog signals and carried via a power cord, via which the codes are transmitted.

Figure 3:
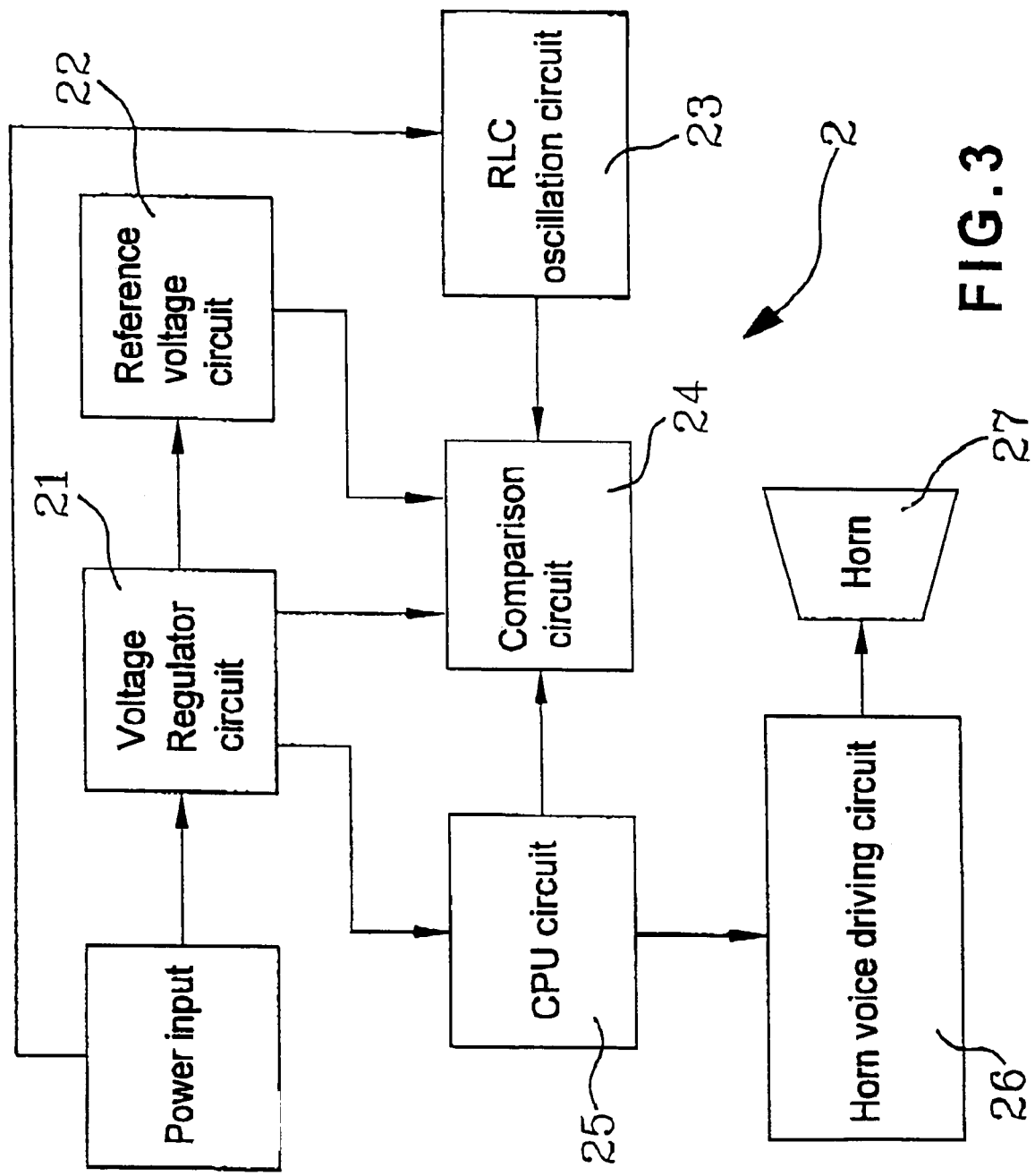
FIG. 3 is a block diagram of a decoding horn of the burglar alarm using a power cord to transmit signals according to the present invention.

FIG. 3 shows the operational principle of the decoding horn 2 of the burglar alarm of the present embodiment. The decoding horn 2 is electrically connected to the power cord so as to obtain a power input, which passes the voltage regulator circuit 21 to provide working voltage and comparing voltage needed by the entire circuitry of the decoding horn 2. The codes carried by the power cord pass the RLC oscillation circuit 23 and the comparison circuit 24, so that the analog signal codes are converted into digital signals, which are then decoded by the CPU circuit 25. The correct signals are sent to the horn voice driving circuit 26 to drive the horn 27 to make required warning sounds.

Figure 2:
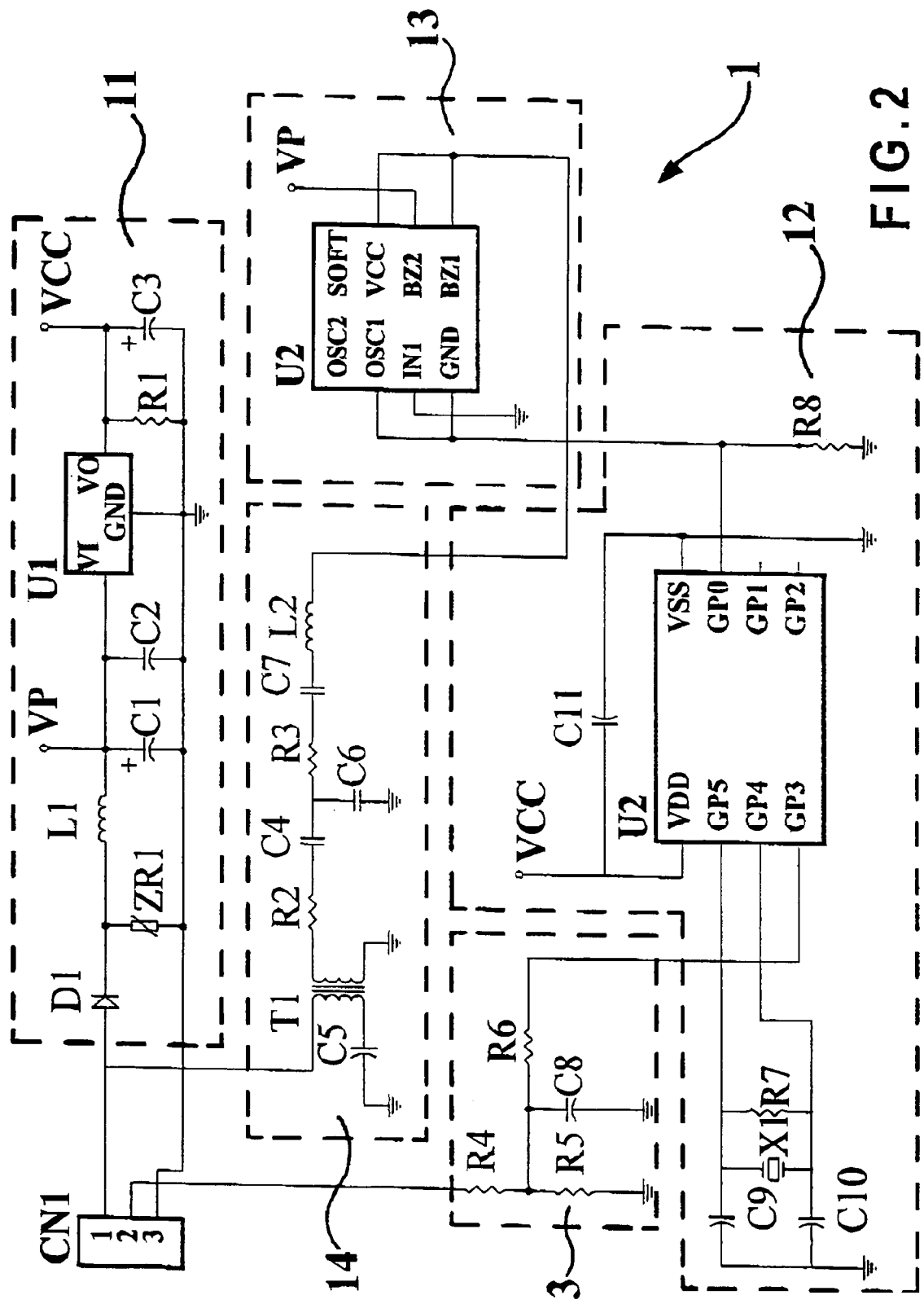
FIG. 2 is a circuit diagram of the main unit of the present invention.

FIG. 2 is a circuit diagram showing detailed circuit configuration of a main unit 1 of the burglar alarm of the present embodiment. The power is input via D1, where reverse-current protection is provided, and then passes ZR1 for noise filtering. L1, C1, and C2 are filters, and U1 is an IC for reducing and stabilizing voltage. The power input with reduced and stabilized voltage passes R1 and C3 and is filtered to supply stable voltage required by the whole circuitry. The externally input control signals pass R4 and R5 that serve as input impedance and divide the voltage. The input control signals are then filtered at C8 and sent to the CPU circuit 12 via R6. C9, C10, X1, and R7 provide the oscillating frequency required by a CPU of the CPU circuit 12, so that digital codes having a specific frequency is generated from the input signals via the CPU.

In an implementation of the present embodiment, a square wave of, for example, 55 kHz may be used to represent code 1, and a square wave of 60 kHz may be used to represent code 0. Of course, signals of other frequencies may be otherwise used to represent code 1 or 0. Alternatively, a specific frequency, such as 55 kHz may be used as a base frequency, and different pulse widths are used as codes 1 and 0. The purpose to use different frequencies to represent codes 1 and 0, or to use a certain frequency as a base frequency and different pulse widths as codes 1 and 0 is to enable convenient modulation of the signals to be carried via a power cord while being distinguishable from noises, so that the noises do not interference with the codes.

The generated digital codes are then sent to U2 of the FET driving circuit 13 and amplified to produce sufficient current for driving the RLC oscillation circuit 14 that consists of L2, C4, C5, and C6. R3 and R2 are impedance match. The input digital codes pass the RLC oscillation circuit 14 formed from L2, Cf, C5, and C6, and are converted into analog signals, which are amplified again at R2 to have sufficient electric energy for coupling from the primary coil to the secondary coil of the transformer T1, and therefore to be carried via the power cord. As a result, when the CPU circuit 12 is sending signals, the code signals exist on all the power cords of the car. Therefore, the decoding horn 2 could be connected to any point on any power cord to receive the signals from the main unit 1 via the power cord without the need of additional wiring for signal transmission. The burglar alarm of the present invention is therefore very convenient for use.

Figure 4:
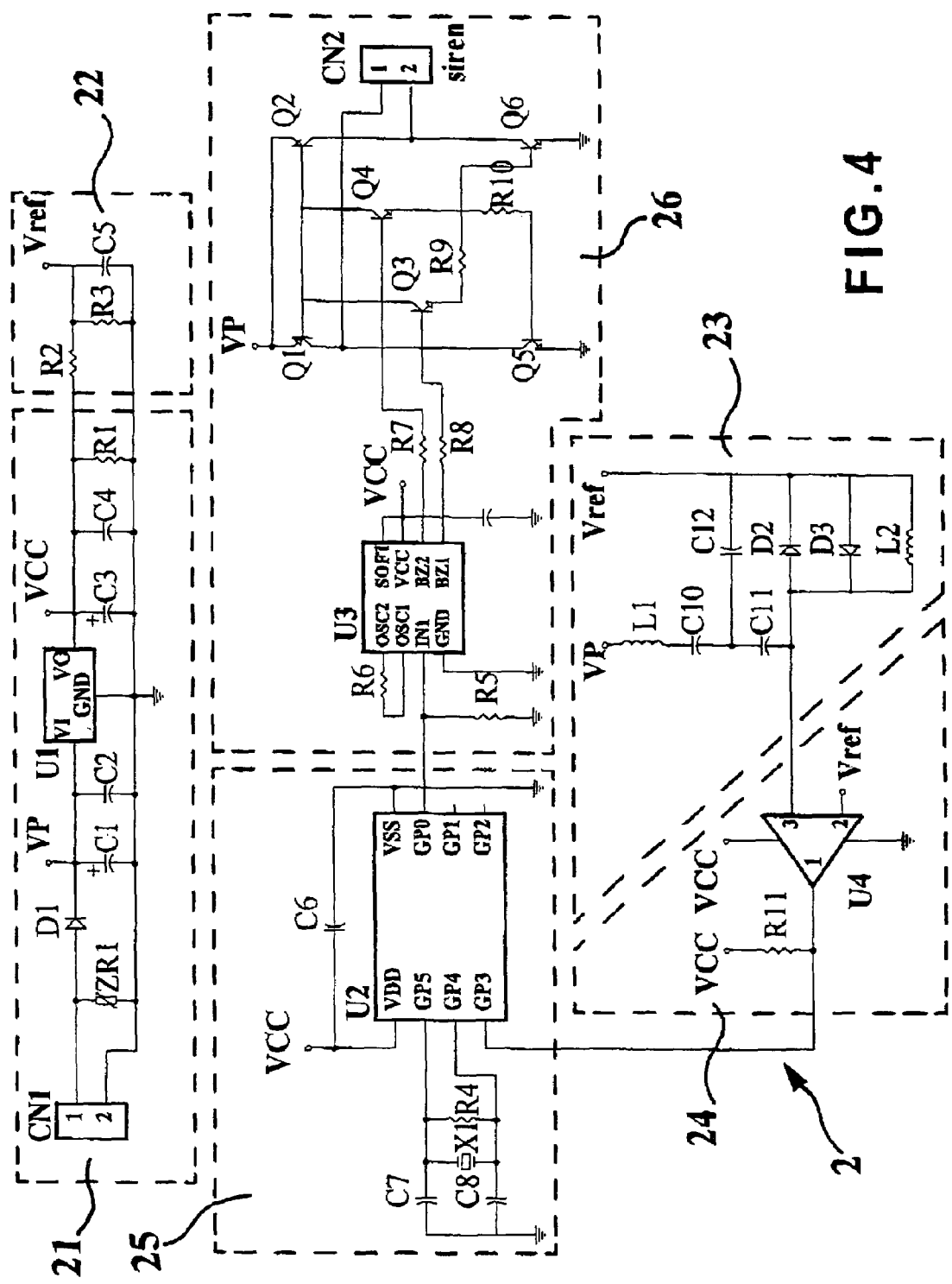
FIG. 4 is a circuit diagram of the decoding horn of the present invention.

Please refer to FIG. 4 that is a detailed circuit diagram of the decoding horn 2 of the burglar alarm of the present embodiment. The power input passes ZR1 for noise filtering. Reverse-current protection is provided at D1. The noise-filtered power supply is filtered at C1 and C2, and voltage-reduced at U1, and then filtered again at C3, C4, and R1 to supply the working voltage required by the whole circuitry of the decoding horn 2. The working voltage is divided at R2, R3, and filtered against at C5 to supply the comparison circuit 24 with a required comparing voltage. The analog code signals carried via the power input are obtained via the RLC oscillation circuit 23 formed from 11, C10, C11, C12, D2, D3, and L2. The RLC oscillation circuit 23 not only filters the initial voltage over the power cord but also amplifies the remaining code signals, which are sent to U4 of the comparison circuit 24 and be converted from analog code signals into digital code signals, which are then sent to the CPU circuit 25 formed from X1, C7, C8, and R4 for discrimination and decoding. Thereafter, the correct signals are sent to U3, which is a voice IC, and Q1, Q2, Q3, Q4, Q5, and Q6 of the horn voice driving circuit 26 to drive the horn 27 to make required warning sounds.

The following are some of the advantages of the present invention:

1. The transmission of signals via a power cord not only eliminates additional wiring to save time and labor for installing the burglar alarm, but also prevents the need to drill the firewall, maintaining its original airtight and watertight ability. Moreover, the problem of mutual interference or asynchronous activity between the main unit and the wireless decoding horn of the burglar alarm due to the same radio frequency thereof could be overcome for the horn to correctly make required warning sounds as soon as an instruction signal is received from the main unit.

2. The use of different frequencies to represent codes 1 and 0, or the use of a specific frequency as the base frequency and different pulse widths as codes 1 and 0 not only enables convenient carrying of the signals via the power cord, but also enables distinguishing of the signals from noises that are characterized by signal voltage amplitude. Thus, the signals transmitted via the power cord are not interfered by the noises.

3. In addition to the burglar alarm, the transmission of signals via a power cord may also be employed to control other electric apparatus on a car, such as, for example, the trunk lid lock, doorlocks, or other in-car electric equipment, without the need of additional wiring. Therefore, an anti-theft lock on a car using a power cord to transmit controlling signals thereof is also included in the scope and the spirit of the present invention.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A burglar alarm using a power cord to transmit signals, comprising:

a main unit internally provided with a power supply voltage regulator circuit for supplying power needed by different sections of said main unit; a CPU circuit for encoding and receiving instructions from an externally connected control circuit, and generating digital codes having a specific frequency from the received signals; an FET driving circuit for amplifying the generated digital codes; and an RLC oscillation circuit for converting the amplified digital code signals into analog signals, which are amplified and then coupled from a primary coil to a secondary coil of a transformer before being carried via said power cord; and a decoding horn internally provided with a power supply voltage regulator circuit for supplying power needed by different sections of said decoding horn; a reference voltage circuit for providing a reference voltage used a said basis in comparison; an RLC oscillation circuit for retrieving analog code signals from the power cord, filtering off the voltage across the power cord, and amplifying the remained analog code signals; a comparison circuit for converting the analog code signals into digital code signals; a CPU circuit for decoding and comparing a received burglar-alarming signal with said reference voltage; and a horn voice driving circuit for driving a horn to make vocal and sounding warnings;

whereby said burglar alarm is controllable by either using different frequencies as codes 1 and 0, or using a specific frequency as a base frequency while using different pulse widths as codes 1 and 0, so that said burglar-alarming signals are carriable via a power cord without interference by noises on the power cord.

* * * * *